United States Patent
Ostroy (10) Patent No.: US 9,033,578 B2
(45) Date of Patent: May 19, 2015

(54) REUSABLE FOOD STORAGE BAG AND PROCESS FOR MAKING A REUSABLE STORAGE BAG

(71) Applicant: Lee Rachel Ostroy, Los Angeles, CA (US)

(72) Inventor: Lee Rachel Ostroy, Los Angeles, CA (US)

( * ) Notice: Subject to any disclaimer, the term of this patent is extended or adjusted under 35 U.S.C. 154(b) by 0 days.

(21) Appl. No.: 14/294,424

(22) Filed: Jun. 3, 2014

(65) Prior Publication Data

US 2014/0270590 A1    Sep. 18, 2014

Related U.S. Application Data

(63) Continuation-in-part of application No. 29/388,569, filed on Mar. 30, 2011, now Pat. No. Des. 712,206.

(51) Int. Cl.
| | |
|---|---|
| *B65D 33/04* | (2006.01) |
| *B65D 33/16* | (2006.01) |
| *B65D 33/00* | (2006.01) |
| *B65D 30/00* | (2006.01) |
| *B65D 30/08* | (2006.01) |
| *B31B 1/84* | (2006.01) |
| *B31B 1/82* | (2006.01) |
| *B31B 1/00* | (2006.01) |
| *B65D 33/25* | (2006.01) |
| *B31B 49/04* | (2006.01) |

(52) U.S. Cl.
CPC ............ *B65D 33/2591* (2013.01); *B31B 49/04* (2013.01); *B65D 33/04* (2013.01); *B31B 2219/14* (2013.01); *B31B 2219/23* (2013.01); *B31B 2219/603* (2013.01); *B31B 2219/6084* (2013.01); *B31B 2219/9016* (2013.01); *B31B 2219/9038* (2013.01)

(58) Field of Classification Search
CPC ........ B65D 33/04; B65D 31/04; B65D 29/00; B65D 31/02; A44B 19/301; A61F 7/08; B31B 21/00; B31B 19/90; B26D 7/18
USPC ............. 383/106, 113, 97, 66, 117, 107, 116, 383/108; 493/222, 213, 393, 394
See application file for complete search history.

(56) References Cited

U.S. PATENT DOCUMENTS

| | | | | |
|---|---|---|---|---|
| 2,209,200 | A | * | 7/1940 | Hanson ...................... 229/162.6 |
| 2,712,337 | A | * | 7/1955 | Tremblay ................... 206/315.1 |
| 2,807,265 | A | * | 9/1957 | Oliva et al. ........................ 383/9 |
| 3,289,386 | A | * | 12/1966 | Farmer ............................ 53/415 |

(Continued)

FOREIGN PATENT DOCUMENTS

JP          05124676 A    *    5/1993    ............. B65D 65/42

*Primary Examiner* — Jes F Pascua
(74) *Attorney, Agent, or Firm* — Brad M. Behar & Associates, PLLC (57) ABSTRACT

The present invention is a washable and reusable storage bag comprising a plastic coated canvas made from cotton and polyethylene. The storage bag comprises a front panel having a zipper and a back panel, a bottom edge and a top edge, and two side edges. The bag further comprises a rectangular transparent polyurethane window in the front panel, preferably in the shape of a rectangle. Two opposing sides of the transparent polyurethane window are heat sealed to the plastic coated canvas to create a liquid tight seal between the transparent polyurethane window and the plastic coated canvas. The outside of the storage bag can be customized with, e.g., designs, branding, and/or advertising. The storage bags can be hand washed, put in the dishwasher or put in the washing machine and clothes dryer.

8 Claims, 11 Drawing Sheets

(56) References Cited

U.S. PATENT DOCUMENTS

| | | | |
|---|---|---|---|
| 4,112,990 A * | 9/1978 | Anderson | 383/97 |
| 4,127,155 A * | 11/1978 | Hydorn | 383/26 |
| 4,211,091 A * | 7/1980 | Campbell | 62/372 |
| 4,417,659 A * | 11/1983 | Hatchell | 206/455 |
| 4,706,856 A * | 11/1987 | Jacober | 224/153 |
| 4,767,377 A | 8/1988 | Falla | |
| 4,987,614 A | 1/1991 | Stongwater | |
| 5,354,131 A * | 10/1994 | Mogil | 383/24 |
| 5,490,396 A * | 2/1996 | Morris | 62/457.2 |
| 5,492,705 A | 2/1996 | Porchia et al. | |
| 6,231,233 B1 * | 5/2001 | Orce | 383/38 |
| 6,676,293 B2 * | 1/2004 | Ferris | 383/67 |
| 6,772,881 B2 * | 8/2004 | Le et al. | 206/305 |
| D541,668 S | 5/2007 | Pokusa et al. | |
| D588,931 S | 3/2009 | Kim | |
| D644,881 S | 9/2011 | van Wijk et al. | |
| 2003/0031387 A1 * | 2/2003 | Gipson et al. | 383/64 |
| 2004/0091185 A1 | 5/2004 | Shibata | |
| 2007/0031071 A1 * | 2/2007 | Perrette | 383/42 |
| 2007/0092167 A1 | 4/2007 | Tilman et al. | |
| 2007/0110340 A1 | 5/2007 | Buchman | |
| 2007/0230834 A1 | 10/2007 | Schneider | |
| 2009/0218247 A1 * | 9/2009 | Kalfon | 206/459.1 |
| 2013/0012847 A1 | 1/2013 | Lowe et al. | |
| 2013/0061436 A1 | 3/2013 | Peters et al. | |
| 2013/0209727 A1 | 8/2013 | Orr | |
| 2013/0254968 A1 | 10/2013 | Gregory et al. | |
| 2013/0255041 A1 | 10/2013 | Weinstein | |
| 2013/0263353 A1 | 10/2013 | Mc Combs | |
| 2013/0269085 A1 | 10/2013 | Damon et al. | |
| 2013/0283736 A1 | 10/2013 | VanLoocke et al. | |

* cited by examiner

REUSABLE FOOD STORAGE BAG AND PROCESS FOR MAKING A REUSABLE STORAGE BAG

CROSS-REFERENCE TO RELATED APPLICATION

The present application claims the benefit of and is a continuation-in-part of U.S. patent application Ser. No. 29/388,569 filed on Mar. 30, 2011 which is expressly incorporated herein in its entirety by reference thereto.

FIELD OF THE INVENTION

The present invention relates to storage bags and more specifically sealable and reusable storage bags. The present invention also relates to storage bags made from washable and breathable materials. The present invention further relates to storage bags with transparent panes, windows, sections, and/or areas that provide for viewing the inside of the storage bag without opening it. The present invention also relates to the process for making a sealable and reusable storage bag.

BACKGROUND OF THE INVENTION

Food storage is a necessity in today's society. In order to keep food fresh in the house, in the refrigerator or the freezer, and to be able to take food on the go, the food must be properly stored. Proper storage of the food, usually in plastic containers or bags that can be sealed, help to keep food fresh for a longer period of time and provide for safe transportation without spillage. When placed in a refrigerator, storage containers and bags help keep the contents inside the storage bag or container separated from other items in the refrigerator. Storage bags and containers also help with transportation of food such as when taking food out of the kitchen or the house. A sealable container or bag helps avoid unwanted spilling of the food (including fluids) during transportation.

When transporting food to work or school, many people use disposable plastic bags, sometimes referred to as baggies. The storage bags are typically sealed/closed with a pressable or slidable zipper seal. Some bags do not seal instead having a tab that folds over the rest of the bag as seen in some sandwich bags.

Storage bags allow for storage of the food separate from other food items and can be discarded after the food has been consumed. Food storage bags are available in a variety of sizes that can store many types and sizes of food from small snacks up to large vegetables, such as a head of lettuce or an eggplant.

Conventional plastic food storage bags, especially the smaller sized bags, are usually made from a thin layer of polyethylene plastic. This plastic is easily pierced by a sharp object that is may be placed inside the bag or that comes into contact with the outside of the bag, such as, for example, a fork or knife. Puncture holes can expose the food to the atmosphere/air and spoil the food and/or cause spillage of the bag contents.

There exist durable plastic food containers, such as Tupperware® containers, that can be washed by hand or in the dishwasher after use and can be reused. These containers are available in a variety of shapes and sizes and can often be used in the refrigerator and microwave. However, these containers tend to be bulky and often do not correlate with the size of the food or snack to be stored. A sandwich may fit into a reusable plastic container, but that container may not fit into a lunch box or backpack. A whole fruit, such as an apple or orange, often will only fit into a large container that will take up substantial space if placed in a backpack or bag. While these containers are made for cleaning in a dish washing machine and can withstand the hot temperatures in a dish washing machine, they are not flexible or conformable like the storage bags.

Disposable plastic food storage bags are also not dishwasher safe or machine washable. Plastic bags are not made to withstand the high temperatures in a dish washing machine and thus, exiting storage bags are intended for single use. If the bags are not properly hand cleaned or sterilized after each use, or if there are particles of food left behind, and depending on the food put in the bag, a growth of bacteria in the bag could contaminate other food placed in the bag upon reuse. Even still, because of their materials and manner of construction, e.g., thin plastic sheets, existing plastic storage bags can only be washed and reused a few times before they break and need to be discarded.

When the plastic bag is discarded a multitude of problems and hazards occur. For instance, most plastic food storage bags are not biodegradable so they continue to collect in landfills or sometimes in places where their presence can cause harm to animals. Marine animals often mistake plastic garbage as food and once the plastic is ingested it can cause an airway blockage or an intestinal blockage, eventually leading to death.

Food storage bags made out of a reusable material have recently been developed. Typically made of a material such as a solid or patterned fabric, these bags can be safely washed after they have been used to store food. Often, these bags include a seal in the form of a hook and loop fastener such as Velcro®. A small square of the hook and loop faster is usually a placed underneath a fold-over flap. Because the fastener is smaller than the flap of the bag, food or other items can spill out of the openings on either side of the fastened portion of the bag. Additionally, food particles may stick to the Velcro® which may be difficult to properly sanitize, resulting in a food safety issue.

There is a need for a durable, reusable, food storage bag that is compact and flexible, machine washable and/or dishwasher safe, has a transparent window so the contents of the bag may be seen, and includes a zipper seal. There is a need for a breathable bag that can be easily stored and transported. There is a need for a reusable bag made of a food safe/compatible material that can be washed and sanitized that helps cut down on the amount of waste for the benefit of the environment. There is a need for a versatile and eco-friendly reusable food storage bag that can be closed securely with a zipper allowing for storage of food next to other foods and protecting the contents from coming in contact with other food.

SUMMARY OF THE INVENTION

Applicant has invented a washable and reusable storage bag that overcomes these and other shortcomings. While the invention will be described in connection with certain embodiments, it will be understood that the invention is not limited to those embodiments. To the contrary, the invention includes all alternatives, modifications and equivalents as may be included within the spirit and scope of the present invention.

The present invention is a durable, reusable, food storage bag that is flexible, machine washable and/or dishwasher safe, has a transparent window so the contents of the bag may be seen without opening it, and that includes a sealable closure (zipper seal).

The present invention is a sealable storage bag made from a washable canvas, a cotton coated with polyethylene. The storage bag comprises a front panel and a back panel, a bottom edge and a top edge, and two side edges. The bag further comprises a transparent polyurethane window in the front panel, preferably in the shape of a rectangle but also including other shapes such as circles, ovals, and other geometric configurations. The transparent polyurethane window is preferably rectangular shaped having four sides. Two opposing sides of the transparent polyurethane window are heat sealed to the plastic coated canvas to create a liquid tight seal between the transparent polyurethane window and the plastic coated canvas. In some embodiments, all sides of the transparent polyurethane window are heat sealed to the plastic coated canvas. Stitching may also be used in addition to heat sealing to attach the transparent polyurethane window to the plastic coated canvas.

The storage bag according to the invention is not limited to having only one transparent polyurethane window but includes one or more additional pieces/sections of transparent polyurethane window(s) that can be attached to the bag in other locations, e.g., on the back panel.

The polyurethane transparent window(s) makes the contents of the bag visible from the outside.

The bag further comprises a zipper closure comprising two pieces of tape/fabric each with teeth, and a pull tab/slider. One side of the zipper closure, at the tape/fabric, forms the top edge of the storage bag with the teeth of the zipper closure located on the front panel of the bag. The tapes of the zipper closure are preferably attached/fastened to the canvas using stitching, but other forms of attachment are included in the scope of the invention including those that create a watertight seal.

The sides of the storage bag where the edges of the front panel meet the back panel are attached using stitching, preferably a merrow stitching. Alternatively, the sides of the storage bag where the edges of the front panel meet the back panel could be heat sealed or attached using other forms of attachment that create a watertight seal.

The bottom edge is formed by a fold made in the plastic coated canvas.

Preferably, the plastic coated canvas is made from a cotton coated with polyethylene but other types of plastic coated textiles are possible including a nylon coated canvas and the like.

The storage bag comprises an interior and an exterior. Preferably the plastic side of the plastic coated canvas is located in the interior of the bag. The outside of the storage bag comprises the canvas material (e.g. cotton) and can accordingly be customized with, e.g., designs, branding, print, and/or advertising. The outside of the bags also can be personalized or labeled with fabric markers or other permanent markers as one can draw on them, write their name, or add any markings they desire.

The storage bags according to the invention are flexible, strong, and can be hand washed, put in the dishwasher, or put in the washing machine and clothes dryer. The plastic coating on the canvas makes the inside of the bag easy to clean.

All components of the storage bag are food safe.

The zipper provides a tight closure that comes clean without tedious removal of food particles such as when food becomes stuck inside hook and loop material.

The present invention also comprises the process for fabricating a reusable storage bag comprising a transparent window made from a plastic coated canvas comprising the steps of:

1. Cutting the plastic coated canvas into preselected shapes and sizes, including rectangular sections, preferably multiples at the same time. There are two different sized pieces required for each storage bag.
2. Cutting the transparent polyurethane window into preselected shapes and sizes, preferably including rectangular sections, preferably multiples at the same time.
3. Tacking/sewing the transparent polyurethane window to two pieces of the plastic coated canvas on opposing sides of the transparent polyurethane window.
4. Heat sealing the transparent polyurethane window to the plastic coated canvas. Adding a reinforcing stitching along the heat sealed portion of the transparent polyurethane window.
5. With the zipper closure opened into two pieces, sewing each side (the front side and the back side) of the zipper closure at each of the tapes to an unattached end of the plastic coated canvas. Folding the tape on one side of the zipper closure to create the top edge of the storage bag.
6. Folding the entire strip of material upon itself with the plastic coated sides adjacent to each other creating the bottom edge.
7. Sewing the unattached and abutting side edges of plastic coated canvas together with stitching, preferably a regular stitching and then a merrow stitching.

BRIEF DESCRIPTION OF THE DRAWINGS

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

DETAILED DESCRIPTION OF THE INVENTION

Reference is being made in detail to presently preferred embodiments of the invention. Selective embodiments are provided by way of explanation of the invention, which is not intended to be limited thereto. In fact, those of ordinary skill in the art may appreciate upon reading the present specification and viewing the present drawings that various modifications and variations can be made.

As shown in the figures, the present invention is a durable, reusable, food storage bag that is flexible, machine washable and/or dishwasher safe. The storage bag according to the invention is breathable.

Figure 1:
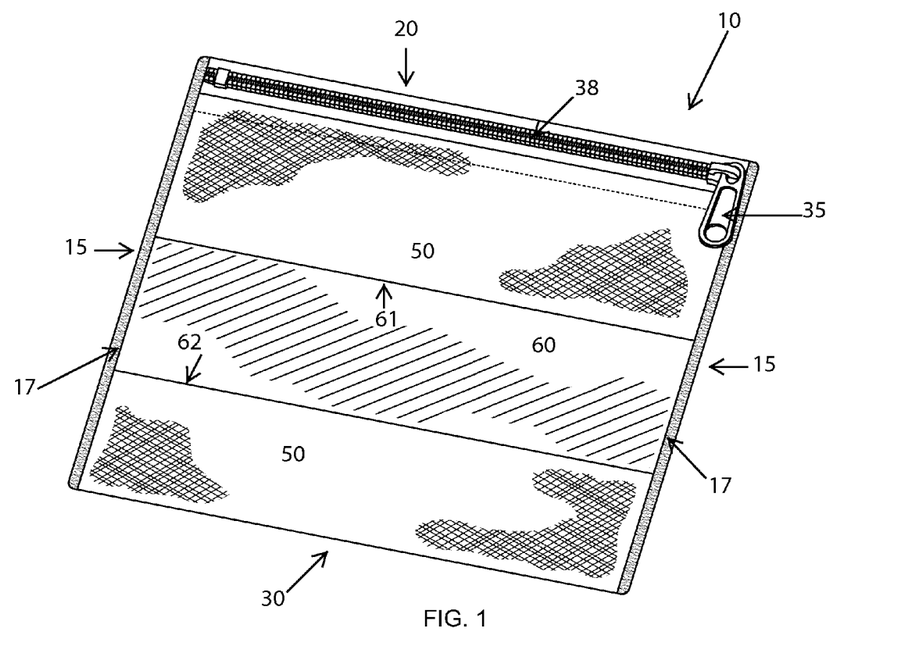
FIG. 1 is a front perspective view of one embodiment of the invention showing the outside of the storage bag according to the invention with the zipper closed.
Figure 2:
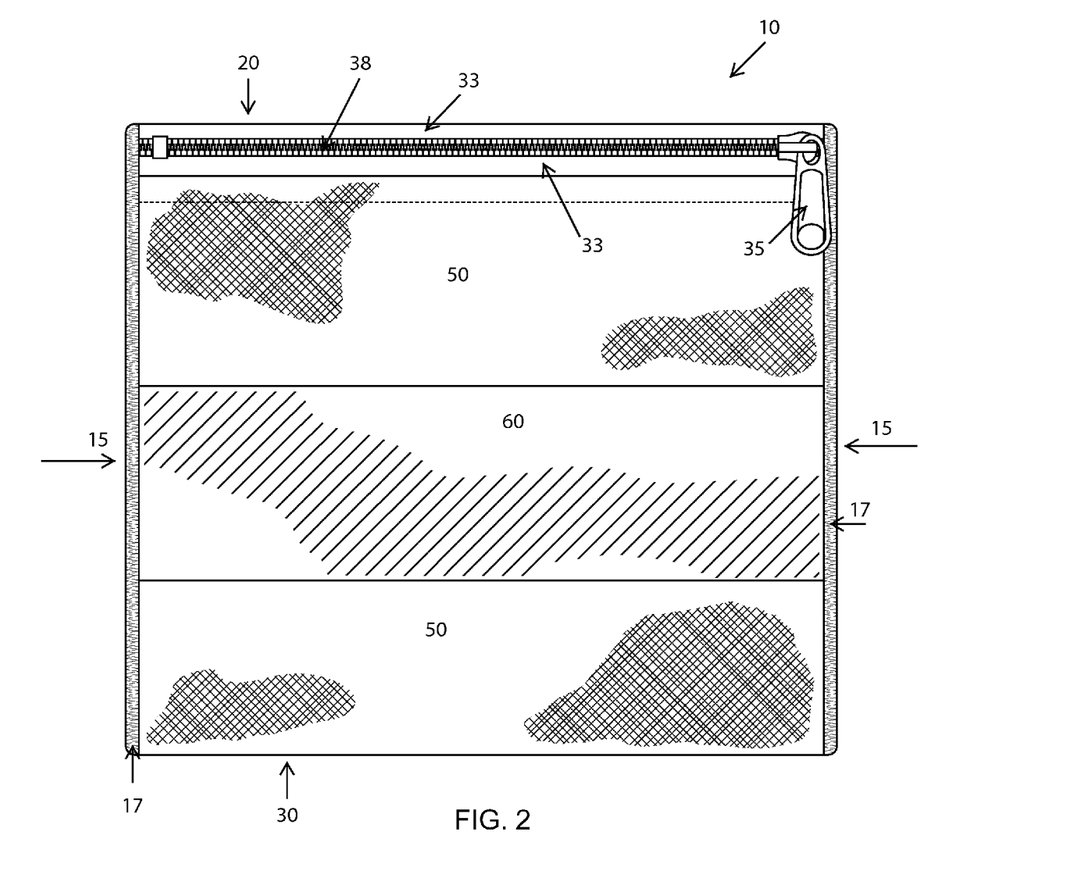
FIG. 2 is a front view of the of the embodiment shown in FIG. 1.
Figure 3:
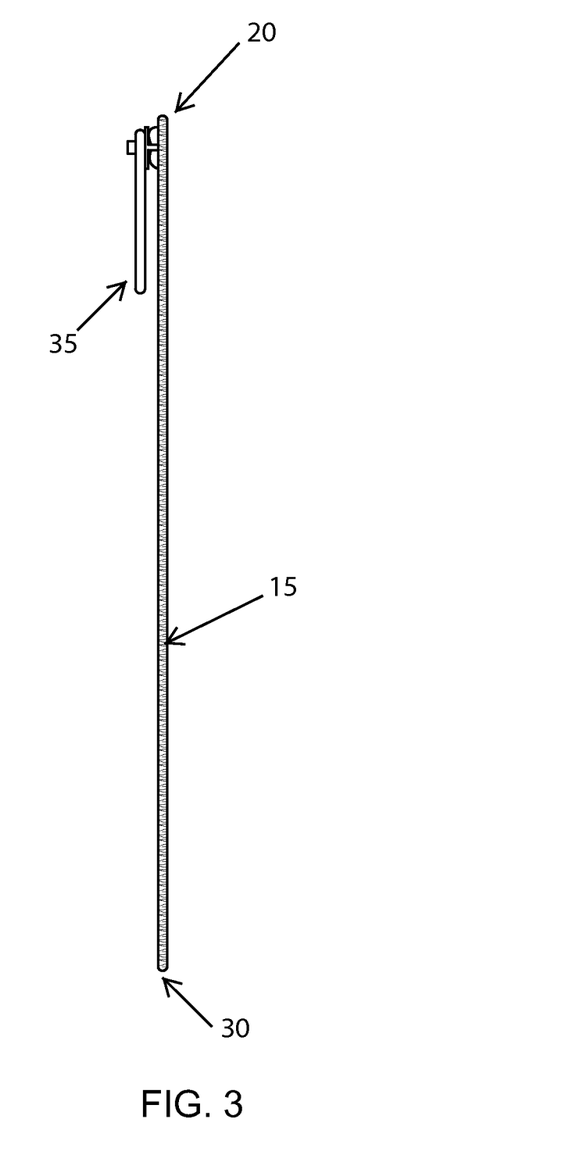
FIG. 3 is right side view of the embodiment shown in FIG. 1.
Figure 4:
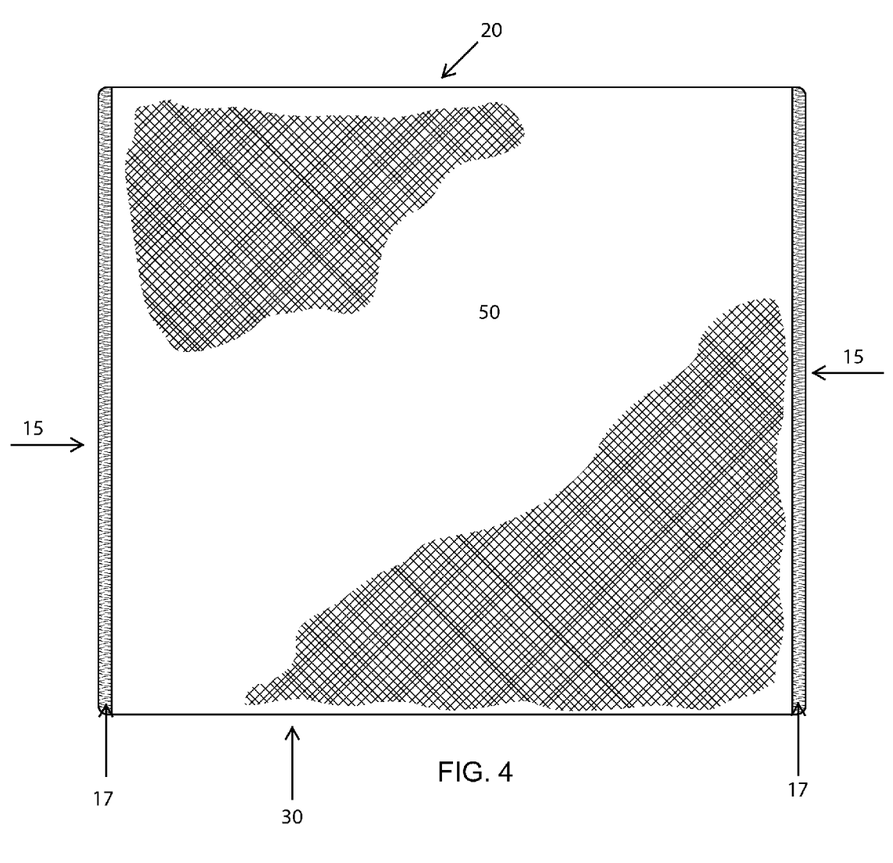
FIG. 4 is a rear view of the embodiment shown in FIG. 1
Figure 5:
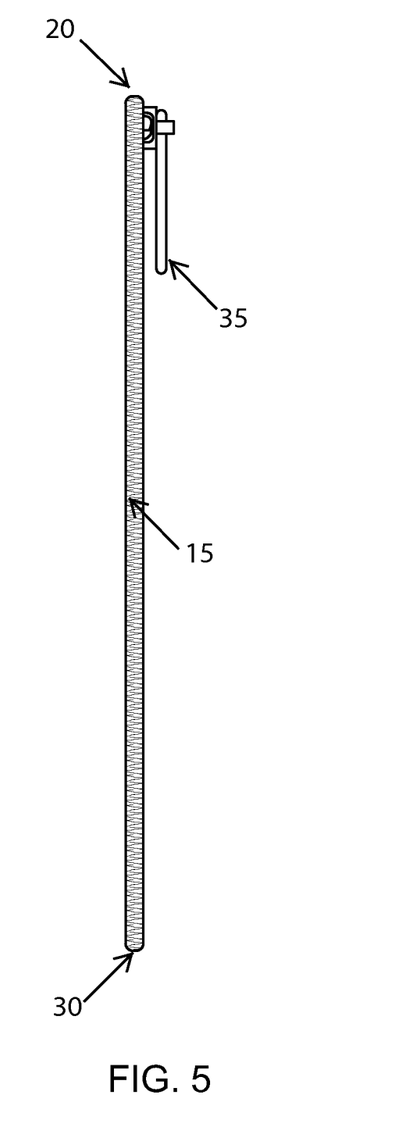
FIG. 5 is a left side view of the embodiment shown in FIG. 1.
Figure 6:
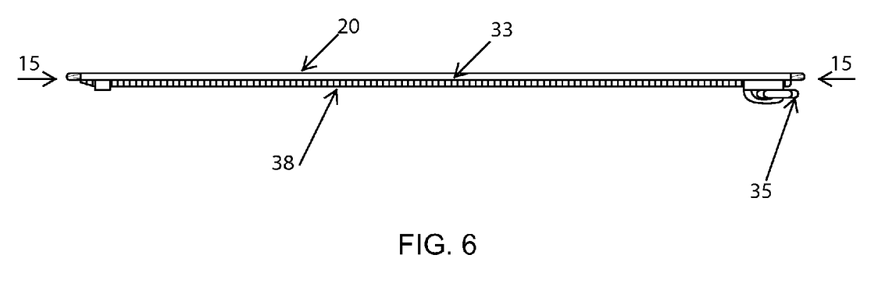
FIG. 6 is a top view of the embodiment shown in FIG. 1.
Figure 7:
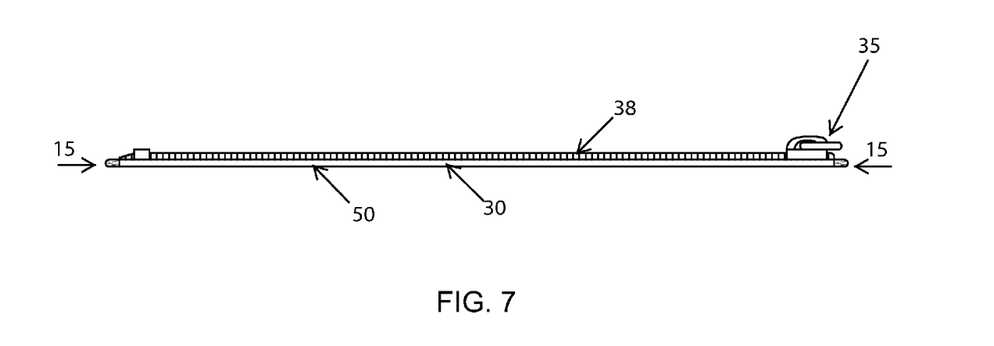
FIG. 7 is a bottom view of the embodiment shown in FIG. 1.
Figure 8:
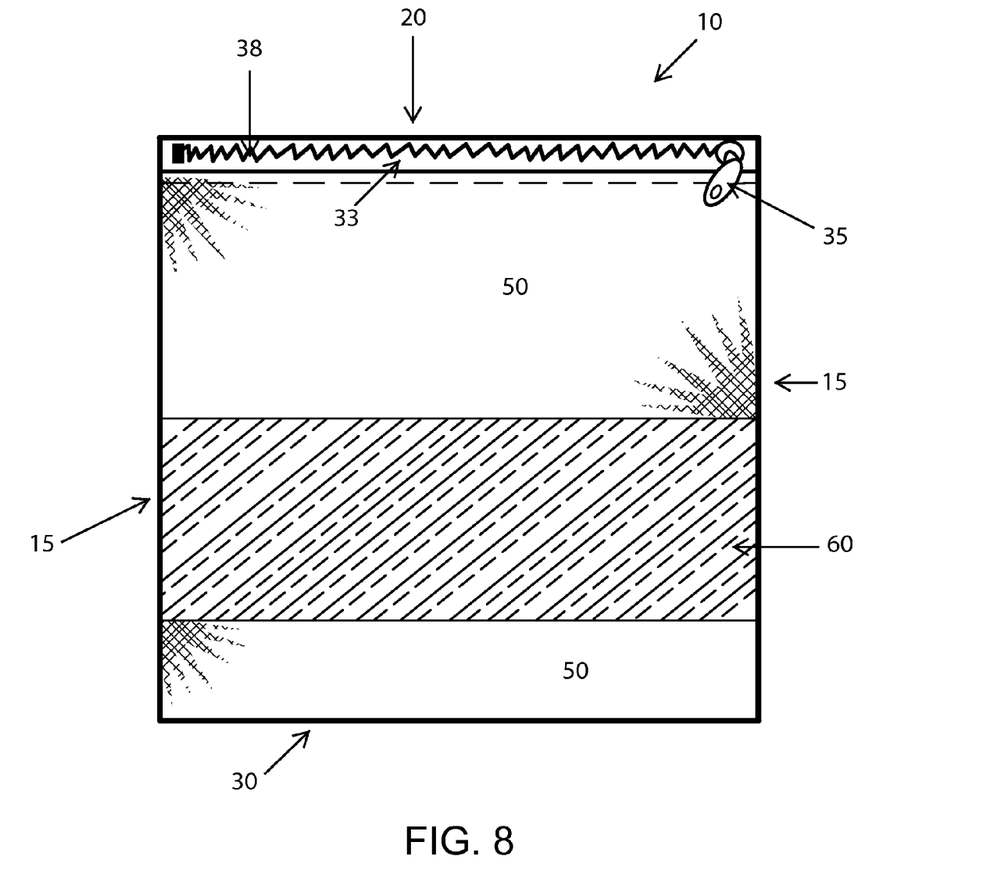
FIG. 8 is a front view of an alternative embodiment of the invention with the transparent window pane located lower on the front panel of the storage bag than as shown in FIGS. 1-7.
Figure 9:
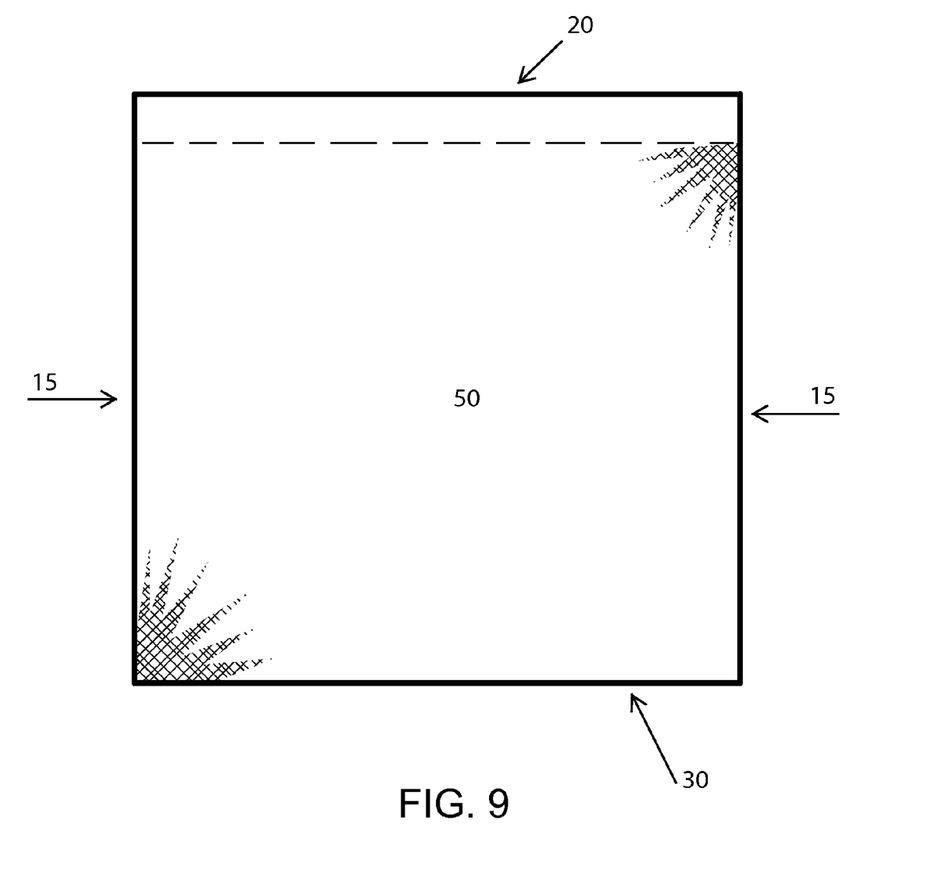
FIG. 9 is a rear view of the embodiment shown in FIG. 8.
Figure 10:
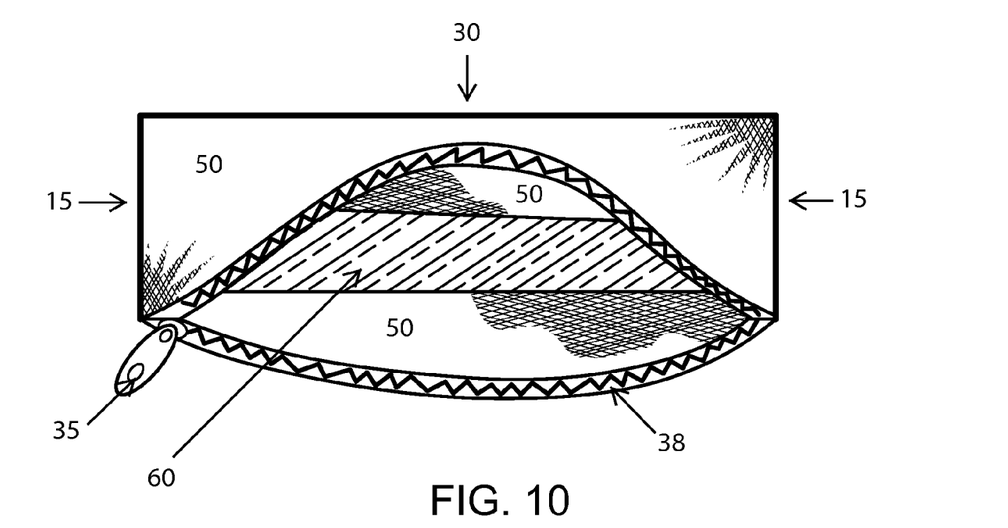
FIG. 10 shows the inside of the bag shown in FIG. 8 with the zipper open.
Figure 11:
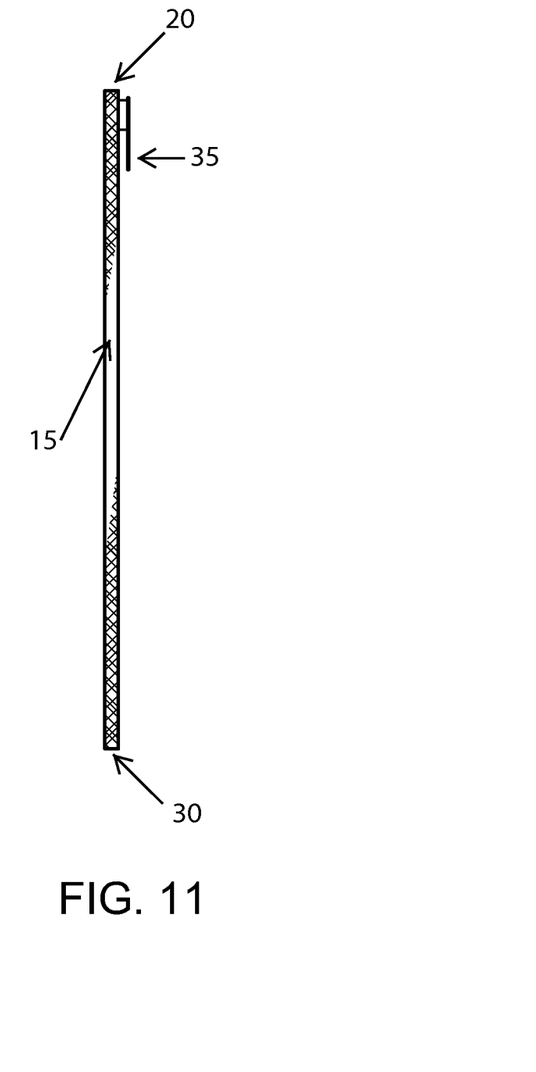
FIG. 11 is a left side view of the embodiment shown in FIG. 8.

The present invention is a sealable storage bag 10 made from a plastic coated canvas 50 made form cotton coated with polyethylene. The storage bag 10 comprises a front panel as shown in FIGS. 2 and 8 and a back panel as shown in FIGS. 4 and 9. The storage bag according to the invention comprises a bottom edge 30, a top edge 20, and two side edges 15. The storage bag 10 further comprises a transparent polyurethane window 60 in the front panel, preferably in the shape of a rectangle as shown in the figures but the invention also includes other window shapes and configurations such as circles, ovals, and other geometric shapes. The transparent polyurethane window 60 is preferably rectangular shaped having four sides about equal in width to the front panel. Two opposing sides (61, 62) of the transparent polyurethane window 60 are heat sealed to the plastic coated canvas 50 (inside the storage bag 10) to create a liquid tight seal between the transparent polyurethane window 60 and the plastic coated canvas 50. Stitching (not shown) may also be used in addition to heat sealing to attach the plastic coated canvas 50 to the transparent polyurethane window 60 for a more sturdy device. Other methods for fastening the transparent polyurethane window 60 to the plastic coated canvas 50, such as glue, are included in the scope of the invention.

The storage bag 10 further comprises a zipper closure comprising two pieces of tape/fabric 33 each piece of tape/fabric comprising teeth 38. The zipper closure further comprises a pull tab/slider 35. One side of the zipper closure, at the tape/fabric 33, forms the top edge 20 of the storage bag with the teeth 38 of the zipper closure on the front panel of the storage bag. The tapes 33 of the zipper closure are attached to the plastic coated canvas 50 using stitching (not shown).

The side edges 15 of the storage bag 10 where the edges of the front panel meet the back panel are attached together using stitching. The Figures show a merrow stitching which is the preferred type for a strong and durable connection the side edges 15. The bottom edge 30 of the storage bag 10 is preferably formed by a fold made in the plastic coated canvas 50 but it could alternatively be a stitched seam like the side edges 15.

The storage bag 10 comprises an interior and an exterior. Preferably the plastic side of the plastic coated canvas 50 is positioned/located in the interior of the storage bag 10. The outside of the plastic coated canvas 50 can accordingly be customized with, e.g., designs, branding, print, and/or advertising. The storage bags 10 can be hand washed, put in the dishwasher or put in the washing machine and clothes dryer.

Although not shown in the Figures one or more additional pieces of transparent polyurethane window(s) can be similarly attached to the storage bag 10 in other locations, e.g., on the back panel.

The invention also includes liquid tight storage bags wherein the side edges are heat sealed and the zipper is a watertight zipper.

The present invention also comprises the process for fabricating a reusable storage bag comprising transparent window made from a plastic coated canvas comprising the steps of:

1. Cutting the plastic coated canvas into preselected shapes and sizes, including rectangular sections, preferably multiples at the same time. There are two different sized pieces required for each storage bag.
2. Cutting the transparent polyurethane window into preselected shapes and sizes, preferably including rectangular sections, preferably multiples at the same time.
3. Tacking/sewing the transparent polyurethane window to two pieces of the plastic coated canvas on opposing sides of the transparent polyurethane window.
4. Heat sealing the transparent polyurethane window to the plastic coated canvas. Adding a reinforcing stitching along the heat sealed portion of the transparent polyurethane window.
5. With the zipper closure opened into two pieces, sewing each side (the front side and the back side) of the zipper closure at each of the tapes to an unattached end of the plastic coated canvas. Folding the tape on one side of the zipper closure to create the top edge of the storage bag.
6. Folding the entire strip of material upon itself with the plastic coated sides adjacent to each other creating the bottom edge.
7. Sewing the unattached and abutting side edges of plastic coated canvas together with stitching, preferably a regular stitching and then a merrow stitching.

I claim:

1. A flexible, durable, sealable storage bag comprising:
   a front panel and a back panel, a bottom edge and a top edge, two side edges, an inside and an outside;
   said storage bag made form a plastic coated canvas comprising cotton coated with polyethylene and a rectangular shaped transparent polyurethane window in said front panel, two opposing sides of said transparent polyurethane window heat sealed to the plastic coated canvas to create a liquid tight seal between the transparent polyurethane window and the plastic coated canvas;
   said storage bag further comprising a zipper closure comprising two pieces of tape each piece of tape comprising teeth, said zipper closure further comprising a pull tab, one side of said zipper closure, at the tape, forming the top edge of said storage bag, said teeth of said zipper closure located on said front panel of said storage bag, said tapes of said zipper closure sewn to said plastic coated canvas;
   said side edges of said storage bag attached together with merrow stitching;
   wherein the contents of the storage bag are visible through the transparent polyurethane window;
   wherein the outside of the storage bag can be customized with ink; and
   wherein the storage bags are dishwasher safe and can be washed repeatedly in a dishwasher without breaking apart.

2. The device according to claim 1 wherein the plastic coated side of the plastic coated canvas is positioned inside the storage bag.

3. The device according to claim 2 wherein the rectangular shaped transparent polyurethane window is about equal in width to the front panel and positioned at about the middle of the front panel between the top edge and the bottom edge.

4. The device according to claim 3 further comprising a rectangular shaped transparent polyurethane window on the back panel.

5. The device according to claim 4 wherein the rectangular shaped transparent polyurethane window on the back panel is about equal in width to the back panel and positioned at about the middle of the back panel between the top edge and the bottom edge.

6. The device according to claim 5 wherein said side edges of said storage bag are heat sealed creating a liquid tight seam at said side edges of said storage bag.

7. A process for making a flexible, durable, sealable storage bag comprising.

> cutting a plastic coated canvas into two preselected shapes and sizes;
>
> cutting a transparent polyurethane window into a preselected shape and size;
>
> tacking said transparent polyurethane window to said two pieces of the plastic coated canvas on opposing sides of said transparent polyurethane window;
>
> heat sealing said transparent polyurethane window to said plastic coated canvas;
>
> adding a reinforcing stitching along the heat sealed portion of the transparent polyurethane window;
>
> with a zipper closure separated into two component pieces, sewing said zipper closure at each of the tapes to an unattached end of said plastic coated canvas;
>
> folding the tape on one side of the zipper closure to create the top edge of the storage bag;
>
> folding the entire strip of connected material upon itself with the plastic coated sides adjacent to each other creating the bottom edge;
>
> sewing the unattached and abutting side edges of plastic coated canvas together using a merrow stitching.

8. The process according to claim 7 wherein said side edges of said storage bag are heat sealed creating a liquid tight seam at said side edges of said storage bag.

\* \* \* \* \*